United States Patent [19]

Suominen

[11] 4,388,354

[45] Jun. 14, 1983

[54] TUBULAR INSULATING CURTAIN AND METHOD OF MANUFACTURE

[76] Inventor: Heikki S. Suominen, Petsamonk 14, Tampere, Finland

[21] Appl. No.: 300,149

[22] Filed: Sep. 8, 1981

Related U.S. Application Data

[62] Division of Ser. No. 942,087, Sep. 13, 1978, Pat. No. 4,288,485.

[30] Foreign Application Priority Data

Mar. 21, 1978 [FI] Finland ................................ 780877
Mar. 21, 1978 [FI] Finland ................................ 780878

[51] Int. Cl.³ ................................................ B32B 3/12

[52] U.S. Cl. ..................................... 428/12; 428/116; 428/188

[58] Field of Search .................. 160/84 R; 428/9, 12, 428/116, 188; 156/193, 291

[56] References Cited

U.S. PATENT DOCUMENTS

| | | | |
|---|---|---|---|
| 765,412 | 7/1904 | Budwig | 428/116 X |
| 2,234,058 | 3/1941 | Murray | 156/197 X |
| 2,734,843 | 2/1956 | Steele | 156/197 X |
| 2,803,578 | 8/1957 | Holland | 156/291 X |
| 2,848,132 | 8/1958 | Davous | 428/116 X |
| 2,973,294 | 2/1961 | McClelland, Jr. | 428/116 X |
| 3,018,205 | 1/1962 | Barut | 428/116 |
| 3,077,223 | 2/1963 | Hartsell et al. | 156/197 X |
| 3,086,753 | 4/1963 | Cushman | 254/93 HP |
| 3,953,110 | 4/1976 | Charoudi | 428/116 X |
| 3,963,549 | 6/1976 | Rasmussen | 156/291 X |
| 4,019,554 | 4/1977 | Rasmussen | 160/84 R |

FOREIGN PATENT DOCUMENTS

| | | |
|---|---|---|
| 23939 | 5/1950 | Finland . |
| 476482 | 9/1969 | Switzerland . |
| 531462 | 1/1941 | United Kingdom . |
| 756270 | 9/1956 | United Kingdom . |
| 935822 | 9/1963 | United Kingdom . |
| 1213217 | 3/1966 | United Kingdom . |
| 1140306 | 1/1969 | United Kingdom . |
| 1497216 | 4/1974 | United Kingdom . |

*Primary Examiner*—Henry F. Epstein
*Attorney, Agent, or Firm*—Pollock, Vande Sande & Priddy

[57] ABSTRACT

A selectively collapsible and expandable insulating curtain having a plurality of collapsible tubes, preferably of plastic material, extending longitudinally for its width and superimposed one on top of the other in a row in the direction of curtain height. Each tube has an upper wall and a lower wall secured together by bands of adhering contact on opposite sides of the tubular cavity. Additional bands of adhering contact secure superimposed tubes to each other longitudinally along midsections of the upper and lower walls. The side bands of contact define fold lines allowing collapse and expansion of the tubes as the curtain is raised and lowered, respectively, in the manner of a venetian blind. The curtain may include additional rows of superimposed tubes one adjacent to the other in the direction of curtain thickness. The tube walls are comprised of a plurality of thin-film strips with bands of adhering material interlaminated between adjacent strips, the width of the mid-section bands corresponding to the desired width of the expanded tubes and the bands between successive adjoining layers being in a staggered relationship. After straightening, means may be secured to the tubular structure for hanging and selectively collapsing and expanding the curtain.

11 Claims, 9 Drawing Figures

FIG. 2
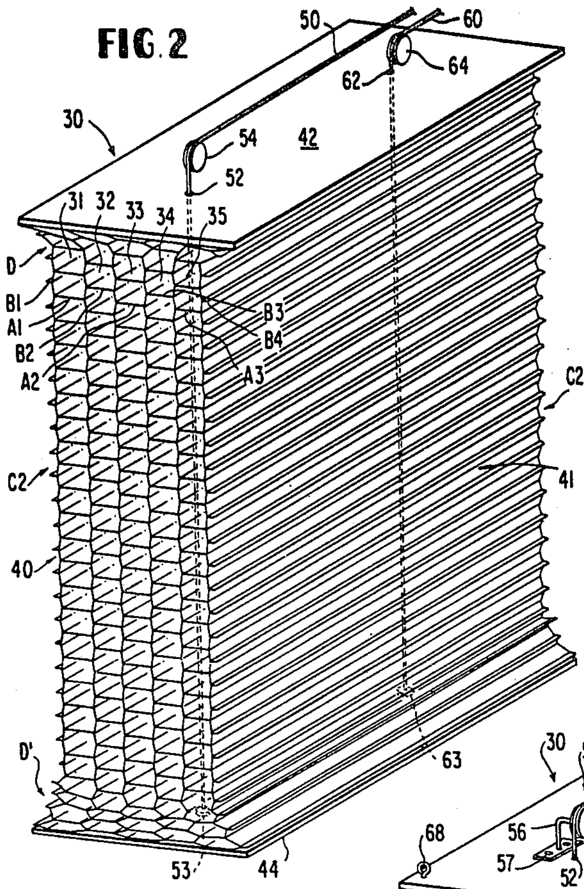
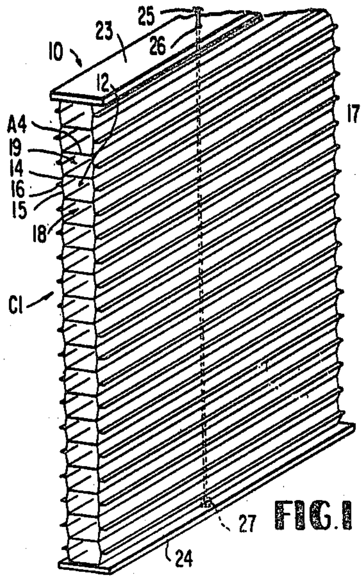
FIG. 1
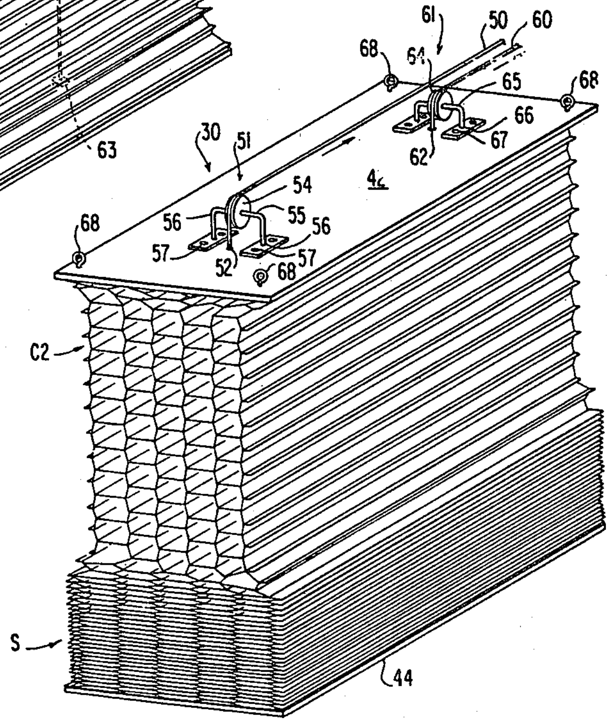
FIG. 3

FIG.5
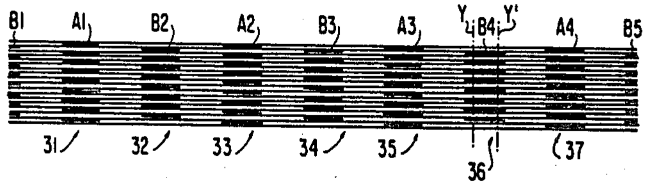
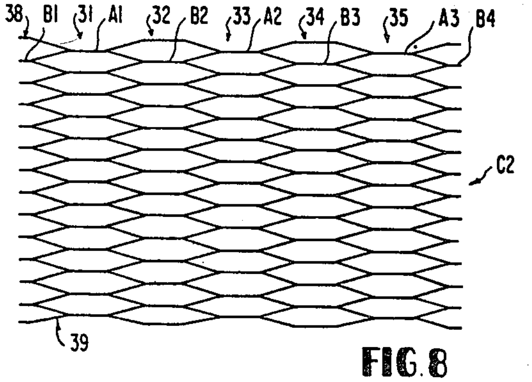
FIG.8
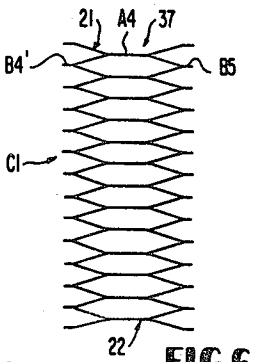
FIG.6
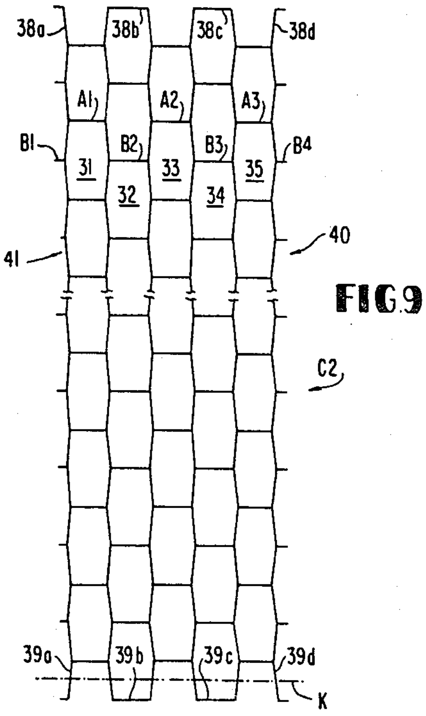
FIG.9
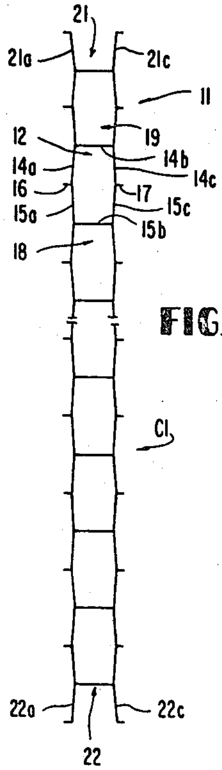
FIG.7

TUBULAR INSULATING CURTAIN AND METHOD OF MANUFACTURE

This is a division of application Ser. No. 942,087, filed Sept. 13, 1978 now U.S. Pat. No. 4,288,485.

BACKGROUND AND SUMMARY OF INVENTION

This invention relates to collapsible and expandable tubular structures, and more particularly to a curtain comprised of flexible strips made into tubular units by bands of adhering contact. The tubular structure can be used as an insulating curtain over openings such as doors, windows and the like. The invention also relates to the method of producing such curtains from continuous strips of thin-film material.

Flexible insulating curtains having tubular units, along with methods of making such structures, are known in the prior art. One such curtain is found in U.S. Pat. No. 4,019,554 and a method for making that curtain is found in U.S. Pat. No. 3,963,549. However, such prior art curtains require relatively narrow tubular foils of 2 to 3 inches in diameter and use a single band of adhesive between adjacent foils. As winding speed is limited by the rate at which adhesive can be applied to the foil, the prior art method is quite slow. Furthermore, the curtain produced has only one tubular thickness.

A beehive like wall structure with multiple cells for insulating purposes is illustrated in Finnish patent No. 23939 of May 31, 1950. The structure is made by gluing thin plates of paper to each other and to outside surface boards at areas of contact on alternating sides of the plates. Although the cellulated structure can be pressed together for transporting and expanded for installation, the insulation board has relatively few cells in each row and those cells could be compressed and expanded only a few times without deterioration of the wall material. According to this patent, the area of glued contact between adjacent plates must be limited to a maximum of $\frac{1}{3}$ of the width of the air cell, presumably to minimize the severe distortion that would occur in the walls of the partial cells adjacent to each surface board. Since the width of the glued area is transverse to the direction in which insulation is desired, the air cells must be fully expanded for effective insulation.

Such disadvantages and limitations of the prior art are overcome by the tubular structure of the present invention which may have a plurality of insulating cavities both in the direction of curtain height and in the direction of curtain thickness. While the insulating properties of one tubular unit are significant, much better insulation can be provided by a plurality of tubular units across the curtain thickness. The insulating characteristics of those units are further enhanced by aligning the bands of adhering contact in the direction to be insulated. The insulating effectiveness of the tubular cavities is thereby maximized and does not change significantly with the degree of expansion.

The novel method disclosed for producing insulating curtains is much simpler and faster and more economical than heretofore known. A plurality of curtains are simultaneously produced from strips of relatively inexpensive material. The individual strips may be of any thin flexible material, and are preferably of thin film plastic. Although narrow relative to length, the strips may be many feet in width, the width being limited only by practical considerations of winding sheet material.

In practicing the method, two or more strips are pulled simultaneously from multiple sources and each passed through a station at which adhesive is applied to one surface in multiple transversely spaced bands. The bands are applied in a staggered relationship and the strips arranged adjacent to each other with an adhesive surface opposing a non-adhesive surface. The bands are preferably of a substantially uniform width and spaced transversely from each other at substantially the same distance. The width of each band corresponds to the desired width of the corresponding tubular unit in its expanded state. Accordingly, the sum of the width dimensions of all bands spaced transversely across two adjacent strips will equal approximately the overall thickness of the curtain when fully expanded. .

After application of the adhesive bands, the strips are interleaved and wound in superimposed layers about the periphery of a forming member so as to interlaminate adjacent strips and the bands of adhesive there between. The staggered bands between successive strips produce tubular units formed with a lower wall from one layer and an upper wall from the next superimposed layer. The upper and lower walls are adheringly secured together by bands of contact on opposite sides of the tubular cavity and each tube thus formed is adheringly secured to the next superimposed tube by a band of contact across a midsection of the upper tube wall. The side bands and the mid band all extend longitudinally along each tube and define non-adhering sidewalls therebetween. Tubular units so arranged will expand or open when stretched in a direction transverse to the plane of the strips.

As used in this specification, a row refers to tubular units aligned with curtain height and not to successive units in the direction of curatain thickness. For a single row of tubes, the minimum number of transverse bands is 3, additional bands being spaced transversely depending upon the number of adjoining tube rows desired. The number of layers wound upon the forming member is chosen to yield the desired number of tubes in each row, which in turn determines curtain height. The interlamination of only two strips is also possible and will produce tubular units adjoined by bands of contact across the width of the strips. Thus, the curtain may have successive tubular units adjoining in the direction of curtain height or in the direction of curtain thickness or in both directions, the latter being preferred.

After winding is complete, the resulting stack of superimposed tubes is cut transversely, removed from the forming member, and straightened into a linear stack. Where the length of the tubes is a multiple of the desired curtain width, a corresponding number of transverse cuts are made to produce multiple curtains. Where there are 3 or more adjoining rows of tubes, a plurality of curtains can also be produced by one or more longitudinal cuts down the tube length.

After straightening, the strips at the top and bottom of the stack may be pulled apart to expand the tubes. The curtain is extended to its full height when the tubes are fully expanded. The end strips may then be moved together to collapse one or more tubes. The tubes collapse in accordion fashion along fold lines formed by the side bands of contact. When flattened, the height of the tube stack approximates the total thickness of the superimposed layers of film material. To facilitate manipulation of the curtain, one end may be secured to a mounting slat and the other to a second slat movable relative to the first. Pull cords and other conventional hardware may be added to the slats to mount the curtain and selectively collapse and expand the tubular units in a manner similar to venetian blinds.

The invention has many additional objects, some of which are set forth here. The tubular structure can be readily mounted, with or without supporting slats along the end strips, in a number of different positions for a wide variety of uses. It has wide utility as a thermal insulating curtain and when extended vertically can serve as a substitute for storm windows, storm doors and the like. The curtain can be extended horizontally and pulled taut to serve as insulation beneath a floor or above a ceiling. The individual tubes can be collapsed and expanded numerous times and provide a curtain having a long usable life. In its collapsed state, either as mounted or as removed for storage, the curtain folds into a stack of thin flat strips neatly aligned in a column.

Curtains of varying height can be made depending upon the number of strips superimposed upon the forming member. Multiple curtains of less height than originally formed can also be made by cutting the linear stack of tubes longitudinally in a direction transverse to curtain height.

The composition of the strip material may be selected to yield light admitting tubes (transparent or translucent), light absorbing tubes (black or other dark colors), or light reflecting tubes. A pigment material may also be added to the adhesive used so that the bands of contact have similar light controlling characteristics. With light controlling bands, the degree of light admitted, absorbed or reflected can be controlled by tilting the upper and lower most strips by means of attached slats which will in turn produce a corresponding tilt of the longitudinally extending bands in a manner similar to the louvers or slats of a venetian blind. Similar light controlling characteristics can be obtained by applying appropriate coatings to one or more sections of each tube wall.

The tubular structure has many other applications, such as structural members for greenhouses and other buildings requiring the admission of large amounts of light and for modular structures utilizing flexible sheet material. The tubular units may be reinforced internally and positioned on end as self-supporting walls, folding doors and other structural components. The tubes may also be sealed and pressurized internally with air as structural members for air supported domes and the like.

Numerous other objects and advantages of the invention will be apparent to those skilled in the art from this specification and the attached drawings.

BRIEF DESCRIPTION OF THE DRAWINGS

The invention, both as to its structure and method of manufacture, may be further understood by reference to the detailed description below taken in conjunction with the accompanying drawings in which:

FIG. 1 is a fragmentary perspective view of the curtain of the invention having a single row of superimposed tubes.

FIG. 2 is a perspective view of a modification of the invention wherein the curtain has a plurality of tube rows in the direction of curtain thickness.

FIG. 3 is a perspective view of the curtain of FIG. 2 showing a portion collapsed into a stack of superimposed tubes and illustrating means for mounting and selectively collapsing and expanding the curtain.

FIG. 5 is an end view of the tubular curtain as removed from the apparatus of FIG. 4 and straightened into a linear stack of fully collapsed tubular units.

FIG. 6 is an end view of the tubular curtain of FIG. 1 as cut from the stack of FIG. 5 along cut line Y' and partially expanded.

FIG. 7 is an end view showing the curtain of FIG. 6 in its fully expanded state.

FIG. 8 is an end view of the tubular curtain of FIG. 2 as cut from the stack of FIG. 5 along cut line Y and partially expanded.

FIG. 9 is an end view showing the curtain of FIG. 8 in its fully expanded state.

DETAILED DESCRIPTION OF THE INVENTION

Figure 4:
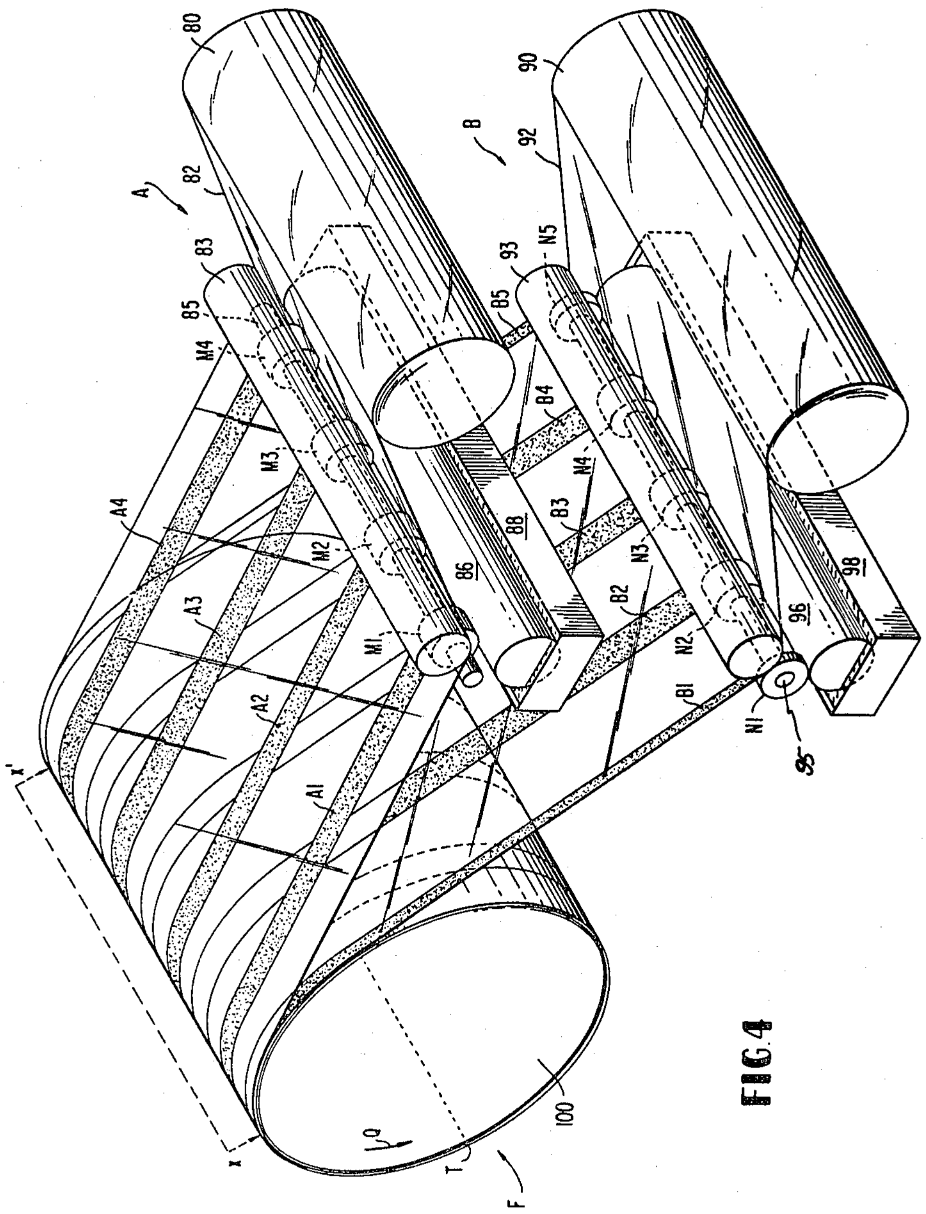
FIG. 4 is a perspective view of an apparatus for making the tubular curtain according to the method of the invention.

One embodiment of the tubular curtain of the present invention, generally designated 10, is shown in FIG. 1 of the drawings. The curtain is comprised of a row of tubes C1 which are superimposed one atop the other in the direction of curtain height as best illustrated in FIGS. 1 and 7. Each tube has the same structure as tube 12 which will be described in detail. The tube 12 has an upper wall 14 and a lower wall 15, each wall having two longitudinally extending edges. The edges of one wall abut the corresponding edges of the other wall along bands of contact 16 and 17 on opposite sides of the tubular cavity. The portions of each wall within the bands of contact 16 and 17 are adheringly secured together by appropriate means compatible with the wall material, preferably an adhesive. With reference to FIG. 7, upper wall 14 has two side sections **14*a* and 14*c* and a mid section 14*b*, and lower wall 15 has two side sections 15*a* and 15*c* and a mid section 15*b*. Tube 12 is superimposed atop an underlying tube 18 and adheringly secured thereto along a band of contact coextensive with lower mid section 15*b*. An overlying tube 19 is superimposed atop tube 12 and adheringly secured thereto along a band of contact coextensive with upper mid section 14*b***.

Although curtain C1 can be hung directly by attachment of uppermost strip 21 to an overhead structure, it is preferably provided with a mounting slat 23 and a movable slat 24 of a much more rigid material, such as wood or metal. The slats may be adjusted relative to each other for collapsing and expanding the curtain by means of a drawstring or pull cord 25 which passes through a series of apertures 26 in the slats and intervening tubes of the curtain. The end of cord 25 is knotted or otherwise secured at 27 to slat 24 so that the latter can be selectively adjusted by manipulation of the cord. Upper slat 23 can be used for mounting the curtain and pull cord 25 arranged for manipulation in the manner described below for the embodiment of FIG. 3.

In the preferred embodiment, the length of the slats corresponds substantially to the width of the curtain and the width of the slats corresponds substantially to the width of the thin-film strips from which the curtain is made. The full length and width of the strips are thereby sandwiched between the slats when the tubes are collapsed. Accordingly, when fully expanded, the transverse width of the tubes is substantially less than the width of the slat. In the embodiment of FIG. 1, the side sections of each tube have a width of about one-half the width of mid sections such that the width of slats 23 and 24 is about twice that of the mid sections. For purposes of illustrating the effect of changing those dimensions, different relative dimensions of the corresponding parts are shown in FIG. 7. Here the side sections are approximately equal to the mid sections. Corresponding slats should therefore have a width about three times the width of the mid sections (if 14$a$=14$c$−14$b$=1″, then 14$a$+14$b$+14$c$=3″).

With further reference to FIG. 7, the row C1 as formed has loose upper ends 21$a$ and 21$c$ and loose lower ends 22$a$ and 22$c$ without sideband adhesive. These loose ends may be cut off or used to secure the top and bottom of the curtain to slats 23 and 24, respectively.

The tubular cavities defined by the upper and lower tube walls contain essentially still or dead air since those walls prevent any transverse movement of air. Accordingly, where a high degree of thermal insulation is desired, the tubes should be made of an impermeable material of low heat conductivity. The tube material should also be sufficiently flexible for the tubes to fully expand under their own weight and the weight of lower slat 24 and of a durability allowing repeated flexure without cracking or other deterioration. A good grade of thin polyethylene or equivalent plastic sheeting will satisfy these requirements.

Each side of the tubular cavity is a composite of two side sections, one from the upper and the other from the lower tube wall. The side bands joining those two sections form fold lines along each side of the tubular units making up the curtain. The double wall thickness and the adhering material at the sideband juncture provide reinforcement of the tube structure at the point of greatest stress and wall flexure.

Another embodiment of the invention is illustrated in FIGS. 2, 3 and 9, the overall structure being generally designated 30 and the curtain portion thereof C2. Curtain C2 is comprised of a plurality of tube rows 31, 32, 33, 34 and 35, one adjoining the other in the direction of curtain thickness. Each row is comprised of a plurality of superimposed tubes having the same structure as the tubes in row C1 of FIG. 1.

The bands of adhering contact between superimposed strips have been assigned a designation corresponding to the bands of adhesive applied when making the curtain as described later with reference to FIG. 4. Referring now to FIGS. 2 and 9, the superimposed tubes of row 31 are joined together by bands of contact A1, the tubes of row 32 by bands B2, the tubes of row 33 by bands A2, the tubes of row 34 by bands B3, and the tubes of row 35 by bands A3. These bands form the mid sections of the corresponding tubes. The upper and lower side sections of tubes 31 are joined together on opposite sides of each tubular cavity by bands of contact B1 and B2, the side sections of tubes 32 by bands A1 and A2, the side sections of tubes 33 by bands B2 and B3, the side sections of tubes 34 by bands A2 and A3, and the side sections of tubes 35 by bands B3 and B4. As evident from the foregoing, those bands intervening between the outer vertical walls 40 and 41 of curtain C2 serve both as a band of contact adjoining superimposed tubes in one row and as a band of contact joining the side sections of the tubes in an adjacent row. Bands inside of outer tube rows 31 and 35 join the side sections of two adjacent rows, one at each edge of the adjoining band. For example, band B2 adheringly secures superimposed tubes 32 one atop the other in the direction of curtain height and also adheringly secures the upper and lower side sections on one side of tubes 31 and the upper and lower side sections on one side of tubes 33. As explained with reference to curtain C1, the bands adjoining the side sections of each tube define fold lines for the collapse and expansion of that tube and the curtain as a whole. The tubes therefore collapse into a symmetrical stack S when compressed together as illustrated in FIG. 3. In FIG. 3, there is shown a pair of pull cords 50 and 60 and corresponding pulley mechanisms 51 and 61 for manipulating the multirow tubular curtain C2. Pull cord 50 passes over a pulley 54 and down through a series of apertures 52 in a support slat 42, a movable slat 44 and the intervening tubes of center tube row 33. The end of pull cord 50 is secured to the movable slat 44 by a knot or other fastening means as seen in FIG. 2. Pulley 54 is rotatably mounted upon a shaft 55 supported by a pair of brackets 56—56 which may be secured to mounting slat 42 by screws 57 or the like. In a similar manner, pull cord 60 passes over a pulley 64 and through apertures 62 and is secured to movable slat 44 at 63. Pulley 64 is rotatably mounted upon shaft 65 supported by a pair of brackets 66—66 which are secured to slat 42 by screws 67 or the like.

The slat 42 may be mounted in a window, doorway or other opening by means of eyebolts 68 or other mounting brackets which may be positioned at each corner of the mounting slat as illustrated in FIG. 3. Mounting eyebolts 68 cooperate with hooks or other cooperating fasteners (not shown) as can be mounted along the top of a frame around the opening or on adjacent structure, such as a ceiling.

The manner in which curtain C2 is attached to end slats 42 and 44 will now be described. With reference to FIG. 9, curtain C2 is preferably made without any adhering material on the upper surface of uppermost strip 38 or on the lowermost surface of lowermost strip 39. This leaves a series of unadhered upper sections 38$a$, 38$b$, 38$c$ and 38$d$ and unadhered lower sections 39$a$, 39$b$, 39$c$ and 39$d$. These may be left alone or cut as illustrated by the cut line K through the lower sections. Although the end strips can be secured to the slats in the shape shown in FIG. 9, it is preferable to attach those strips in a flattened state so that a neatly folded stack S will be produced when the curtain is collapsed. Before attachment, the side sections 38$a$ and 38$d$ and 39$a$ and 39$d$ are pulled transversely apart in the direction of curtain thickness causing the uppermost and lowermost tubes of rows 32 and 34 and some adjacent tubes to flatten as seen in areas D and D′ of FIG. 2. The flattened upper and lower surfaces are then secured to the corresponding slats by an appropriate means of attachment, such as a layer of adhesive. Staples, nails and similar means of physical attachment can also be employed. When the curtain is so secured, the distortion in areas D and D′ is relatively minor and dampens out within a few tubes of the end of each row so that the major intervening portion of the curtain expands into a symmetrical undistorted shape of attractive appearance.

The width of the side sections and mid sections of each tube will again determine the width of the slats to be used with the curtain. The slat width is, of course, also a function of the number of tube rows making up the curtain. Preferably, the number of rows and the section widths are chosen so that the collapsed thickness does not exceed twice the fully expanded thickess of the curtain. Where the curtain consists of five tube rows as shown, the width of each side section should be about ½ the mid band width. Thus if the mid band width is 1" and the side section width is ½", the thickness of the fully expanded curtain will be about 5" and the slat width should be about 8" (5 mid bands=5", 6 side sections=3" and 5"+3"=8"). These relative dimensions approximate those illustrated in FIGS. 2 and 3. For purposes of illustrating the effect of these dimensions, the side sections shown in FIG. 9 have a width about equal to that of the mid bands. If the outermost bands B1 and B4 are to be included between the slats, the slat width should be increased by those increments.

The method of making the tubular curtain of the present invention will now be described. With reference to FIG. 4, a first supply roll 80 and a second supply roll 90 provide continuous strips 82 and 92 of thin-film material, preferably thin sheets of plastic. Strip 82 passes through an upper adhesive station A comprised of a guide roller 83 for tensioning and directing the strip over a series of applicator wheels M1, M2, M3 and M4 mounted for rotation upon a shaft 85. The applicator wheels M contact the underside of strip 82 and underlying those wheels is a pick-up roller 86 mounted for rotation partially submerged in an adhesive contained in a trough 88.

Strip 92 passes through a lower adhesive station B comprised of a guide roller 93 for tensioning and directing the strip over a series of applicator wheels N1, N2, N3, N4 and N5 mounted for rotation upon a shaft 95. The applicator wheels N contact the underside of strrip 92 and underlying those wheels is a pick-up roller 96 mounted for rotation partially submerged in an adhesive contained in a trough 98. After passing through the adhesive stations, strip 92 is interleaved beneath strip 82 and the two strips wound simultaneously upon a forming member, generally designated F. It is to be understood that the supply rolls, the rollers and wheels of the adhesive stations, and the forming member are suitably mounted for rotation relative to each other, and that the forming member is driven by conventional machinery to wind the continuous strips 82 and 92 thereon in interleaved fashion. Guide rollers 83 and 93 maintain sufficient tension on the strips to produce a flat even stack of superimposed strips around the periphery of the forming member.

The forming member is shown as a cylindrical drum 100 for purposes of illustration. The forming member may take other shapes capable of providing a continuous winding surface about their periphery. For example, the member may be comprised of an endless belt supported upon two or more drums or rollers as shown in U.S. Pat. No. 3,963,549.

The manufacturing process is initiated by detachably fastening the end of strip 92 to the periphery of the forming member F by means of clamping devices (not shown) so that movement of the periphery in the direction of arrow Q will pull the strip from the supply roll and through adhesive station B. Strip 92 is attached to the forming member approximately at location T. The end of strip 92 is pulled around once and then the end of strip 82 is attached at approximately the same location by means of a second clamping device (not shown). Adhesive stations A and B are then placed in position for application of the adhesive to each strip. As strip 82 is pulled through station A, roller 86 picks up adhesive from trough 88 and supplies it to the set of aplicator wheels M which in turn apply the adhesive to the underside of the strip in a plurality of narrow transversely spaced bands extending longitudinally along the strip length, bands A1, A2, A3 and A4 being applied by applicator wheels M1, M2, M3 and M4, respectively.

As strip 92 is pulled through station B, roller 96 picks up adhesive from trough 98 and supplies it to the set of applicator wheels N which in turn apply the adhesive to the underside of the strip in a plurality of narrow transversely spaced bands extending longitudinally along the strip length, bands B1, B2, B3, B4 and B5 being applied by applicator wheels N1, N2, N3, N4 and N5, respectively.

After application of the adhesive bands, the strips are wound in interleaved fashion around the periphery of the forming member to produce bands of contact adheringly securing each strip to the next superimposed strip. The upper set of adhesive bands A is offset transversely relative to the lower set of adhesive bands B as viewed from left to right in FIGS. 4 and 5. This offset between adhesive bands A relative to adhesive bands B staggers the bands of adhering contact between successive strips. Thus, the transverse distance between adjacent bands on opposite sides of the same strip substantially defines the width of the unadhered side section of each tube wall. It is this staggered relationship that produces the expanded curtain structures shown in FIGS. 6 through 9.

This distance around the periphery of the forming member is preferably equal to or a multiple of the width of the curtains to be made. When the number of windings on the forming member will produce the desired height of the curtain in its expanded state, the winding operation is stopped and the wound stack of tubes cut transversely along a line X—X' shown in FIG. 4. A single cut produces a curtain width equal to the circumferential distance. Multiple cuts corresponding to the number of curtain width multiples making up the circumferential distance will produce the corresponding number of curtains. The first cut line X—X' is preferably over the location at which adhesive was first applied to the first layer of strip 82. The distance between that location and the point of attachment T is determined by the distance between the adhesive stations and the point of attachment, that being the distance the adhesive must travel before interlamination occurs.

After severing the strips along line X—X', the winding is removed. Since no adhesive was placed on the underside of the first strip of material, there is no adhering contact between that strip and the underlying supporting surface and the winding is easily pulled away from the forming member after cutting. Upon removal, the strips are straightened into a linear stack. With reference to FIG. 5, a plurality of adjoining tube rows 31, 32, 33, 34, 35, 36 and 37, each comprised of a plurality of tubes superimposed one atop the other, are thereby produced.

The number of tube rows produced is such that a plurality of curtains of the same height and width but having differing numbers of adjacent rows can be made simultaneously as illustrated by the cut lines Y and Y' of FIG. 5. Two cut lines are employed to minimize the width of resulting side bands B4 and B4'. Longitudinal cuts are preferably made through the adhering bands of contact to maintain the integrity of tube walls on both sides of the cut line. The two resulting segments form the curtain C1 of FIG. 6 which has a single row of tubes and the curtain C2 of FIG. 8 which has five rows of tubes, one adjoining the other in the direction of curtain thickness.

The segment of FIG. 6 is shown fully expanded in FIG. 7. The segment of FIG. 8 is shown fully expanded in FIG. 9. As previously indicated, there is no adhesive material on the upper surface of strip segmens 21 and 38 or the lower surface of strip segments 22 and 39.

The foregoing specific embodiments are merely exemplary of the various embodiments possible and the true scope of the invention is not to be limited to those embodiments but is defined by the claims at the end of this specification. Other embodiments and modifications of both the product and method of the invention will be apparent to those skilled in the art from consideration of the disclosure as a whole.

For example, the adhering bands of contact between the strips can be produced by means other than adhesive coatings, such as by thermal or solvent welding of the strip material. Furthermore, the tube wall midsections need not be coextensive with the bands of contact. Instead, the bands may be interrupted along their length or consist of two narrow strips along each edge of the midsection. The bands of contact may also be reinforced with longitudinal braces of resilient material laminated between the wall midsections along with the adhesive. The mid bands may also be spaced transversely from the side bands by unequal distances or offset from each other to produce tubular cavities of varying shapes when in the expanded state.

Other modifications to the bands of contact can be made and are within the contemplation of this invention. Thus, the bands need not be parallel but can follow other relative courses down the length of the strips. Such bands can be produced by relative movement between the applicator wheels of the adhesive stations. The width of each band may also be varied across the width of the strip by varying the thickness of the applicator wheels in each set. Similarly, an applicator wheel of varying thickness about its circumference will produce a band of varying thickness with non-parallel sides. Where the bands of contact include an adhesive coating, the coating may contain pigments causing it to either absorb or reflect heat and light. Similarly, while the strips are preferably of a transparent or translucent material, they may include light absorbing or light reflective material.

The interlaminated stack of strips is rapidly produced on the forming member through the use of multiple strip sources. Although multiple adhesive stations are shown in FIG. 4, it is to be understood that a single adhesive station may apply bands to each side of a single strip with the bands on one side being spaced transversely in staggered relation to the bands on the opposite side. Where adhesive bands are applied on opposite sides of the same strip, a strip without adhesive is interleaved between each adhesive strip to produce the staggered tubular structure illustrated in the drawings. As another modification, a single strip can be wound with bands applied alternately to opposite sides in the staggered relationship required, each set of bands extending for one revolution of the forming member.

The uppermost and lowermost strips of the curtain may be of a sheet material thicker than the intervening strips forming the body of the curtain. Similarly, the outer edges of each strip may be thicker than the central portion. Such increases in thickness would provide reinforcement for those parts of the curtain subject to greatest stress and the most wear and tear.

A number of other modifications usable with the present invention appear in U.S. Pat. Nos. 3,963,549 and 4,019,554 and those patents are incorporated herein by reference as if set forth verbatim.

What is claimed is:

1. A selectively collapsible and expandable curtain having in its fully expanded state a predetermined width, a predetermined height and a plurality of expanded tubes extending across the width of the curtain so as to provide thermal insulating characteristics in the direction of curtain thickness, said curtain comprising:

(a) a plurality of superimposed strips of flexible thin film material, said superimposed strips being adheringly secured together by a plurality of uniformly spaced longitudinally extending bands so as to form superimposed tubes one atop the other in the direction of curtain height, and the length of said superimposed strips being substantially equal to said predetermined curtain width and significantly greater than the width of said superimposed strips in said direction of curtain thickness;

(b) said bands on successive adjoining strips being in a staggered relationship such that each tube when fully expanded has a width substantially defined by a pair of opposing bands on upper and lower adjoining strips and a height substantially defined by upper and lower side sections comprising the portions of said adjoining strips lying between said pair of opposing bands and a pair of transversely spaced bands joining said upper and lower adjoining strips on either side of said opposing bands;

(c) said side bands forming fold lines such that said superimposed strips are substantially flat without folds when said curtain is in a collapsed state; and, (d) the number of said superimposed strips being such that the combined heights of said superimposed tubes in their fully expanded state are sufficient to provide substantially said predetermined curtain height, each of said tubes when fully expanded having a substantially rectangular cross-section with top and bottom walls defined by said opposing bands and sidewalls defined by said upper and lower side sections and a length along the longitudinal axis of the tube significantly greater than the thickness of the curtain transverse to said axis.

2. The curtain of claim 1 which further includes a second set of said superimposed tubes adjacent to said first set of superimposed tubes in the direction of curtain thickness, said second set of superimposed tubes being in staggered relationship to said first set of superimposed tubes when said curtain is in an expanded state.

3. The curtain of claim 1 which includes means for mounting said curtain and for selectively expanding and collapsing said tubes.

4. The curtain of claim 3 wherein said collapsing and expanding means includes a slat of relatively rigid material secured to the upper end of said curtain, a second slat of relatively rigid material secured to the lower end of said curtain, and means extending between said slats for moving one relative to the other in the direction of curtain height so as to regulate the expanded state of said superimposed tubes.

5. The curtain of claim 1 in which said tubes are of an impermeable material.

6. The curtain of claim 5 wherein said impermeable material is plastic.

7. The curtain of claim 1 wherein said bands are comprised of an adhesive interlaminated between said adjoining strips.

8. The curtain of claim 1 which includes means for controlling the passage of light through the curtain.

9. The curtain of claim 1 wherein said bands are parallel to each other.

10. The curtain of claim 1 wherein a plurality of collapsible second tubes adjoin said collapsible first tubes in the direction of curtain thickness and said first and second tubes are parallel to each other.

11. The curtain of claim 10 wherein a plurality of said second tubes are joined one to the other in the direction of curtain thickness.

* * * * *